(No Model.)
J. E. HELLER.
VEHICLE.
No. 254,873. Patented Mar. 14, 1882.
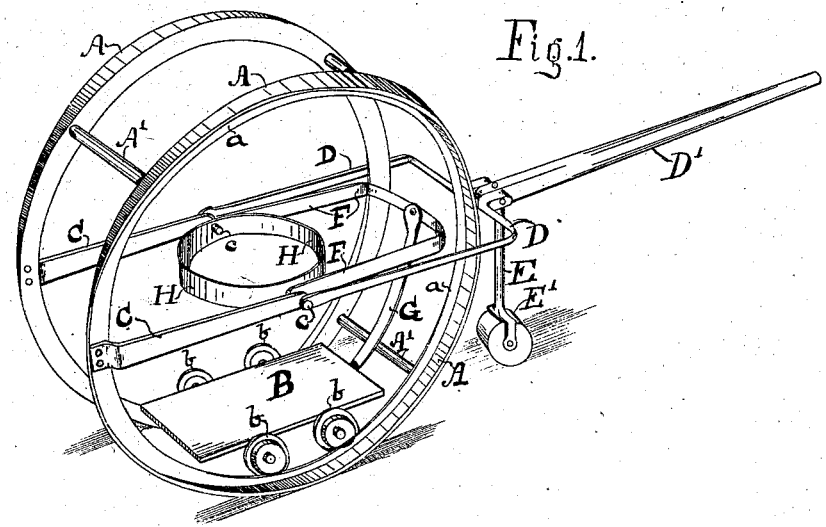
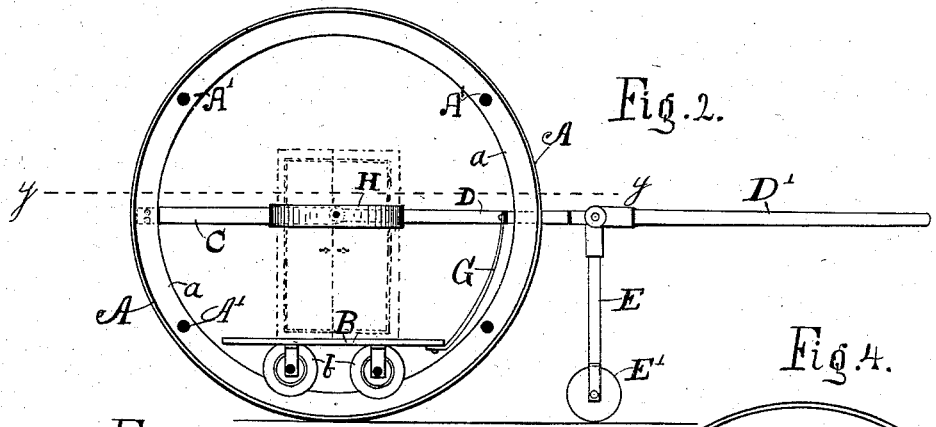
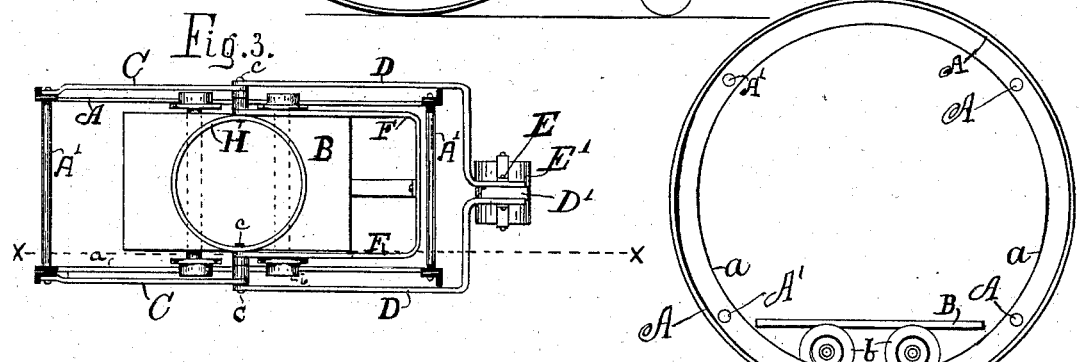
WITNESSES.
Jacob. W. Loeper
Chas. L. Thurber
INVENTOR.
James E. Heller,
PER
C. Bradford
ATTORNEY.

UNITED STATES PATENT OFFICE.

JAMES E. HELLER, OF INDIANAPOLIS, INDIANA.

VEHICLE.

SPECIFICATION forming part of Letters Patent No. 254,873, dated March 14, 1882.

Application filed December 21, 1881. (No model.)

*To all whom it may concern:*

Be it known that I, JAMES E. HELLER, of the city of Indianapolis, county of Marion, and State of Indiana, have invented certain new and useful Improvements in Vehicles, of which the following is a specification.

The object of my said invention is to provide a means of transporting heavy bodies with but comparatively a small amount of motive power; and it consists essentially of a pair of large wheels adapted to have draft-rods attached thereto from the outside, and having the inner sides of their rims adapted to serve as track-rails, a truck or car (having much smaller wheels) mounted upon said track-rails, and draft-rods attached to said large wheels, whereby power from the outside can be applied directly from the outside for purposes of locomotion. It further consists of some details of construction, as will hereinafter be more specifically set forth.

I am aware that vehicles have been constructed wherein one portion traveled upon the internal surface of another portion, but wherein the means of drawing or propelling the vehicle was attached to the inner portion instead of the outer portion. In such cases, however, the motive power has no leverage upon the load to be moved, which is the distinguishing feature of my invention.

Referring to the accompanying drawings, which are made a part hereof, and on which similar letters of reference indicate similar parts, Figure 1 is a perspective view of my improved vehicle provided with most of the attachments which I have contemplated; Fig. 2, a longitudinal vertical section thereof on the dotted line $x\,x$; Fig. 3, a horizontal section, looking downwardly from the dotted line $y\,y$; and Fig. 4, a side elevation of the same in its simplest form.

In said drawings, the portions marked A represent the large wheels or rims, which are connected together by cross-bars A', and are provided with the internal track-rails, $a$; B, the truck, which is mounted therein on the wheels $b$, which are preferably of the general form of ordinary car-wheels; C, arms secured to the rims A and extending to the center of the device, where short shafts or gudgeons $c$ project therefrom, or in which are bearings for similar shafts on draft-rods; D, draft-rods, which are connected to the center of the device by means of said short shafts and bearings, and extend forward and come together in a tongue or arm, D', by which the vehicle is commonly drawn; E, a supporting-standard, terminating in a truck, E', by which the draft-rods are maintained at the proper level; F, a frame attached to the inner portions of the short shafts $c$, and extending around near the rims A and cross-bars A', from one to the other of said short shafts; G, a rod or bar connecting said frame to the front end of the car or truck; and H, a hoop or rest, by which tall loads may be sustained in position, and which is mounted on the inner ends.

The operation of my said invention is as follows: The load to be transported is placed upon the truck B and secured thereon, either by being extended up through the ring H, as shown by dotted lines in Fig. 2, or otherwise. The large wheels are then rotated, which causes the relative position of the rails $a$ to the truck to be that of a continual incline, down which said truck will continually descend. By this means not only is the great advantage gained of having a low-bodied vehicle with very high wheels, but an advantage entirely peculiar to this device of having the load rest directly upon a portion of the carrying-wheels of the vehicle much lower than the point to which the motive power is applied, (in this case the short shafts $c$,) which gives the motive power a great leverage and correspondingly reduces the amount required to move the load, less the resistance caused by the friction of the wheels of the truck, which is inconsiderable. The truck B is prevented from having an intermittent motion by the rod G, which is connected thereto, and to the frame F, which is rigidly attached to the short shafts $c$. This, however, is not an essential feature of my invention, though a valuable one, as the device in its plainest form (see Fig. 4) can be made to operate and accomplish the end desired, though in a somewhat less satisfactory manner. In the construction shown the shafts $c$ are secured rigidly to the draft-bars D and frame F, and revolve in bearings in the ends of the arms C. Said draft-bars and said frame are thus made rigid with each other.

The ring or rest H is mounted loosely on the inner ends of the short shafts c and revolves freely thereon. Its use is to steady tall articles which are being transported and prevent them from toppling over.

Having thus fully described my said invention, what I claim as new, and desire to secure by Letters Patent, is—

1. The combination, in a vehicle, of a pair of rims or fellies of large size, having track-rails upon their internal surfaces, means, substantially as described, and acting directly upon said rims, for propelling the same, and a truck or carriage having much smaller wheels, which is adapted to travel upon said rails, whereby when said large rims are revolved a continually-inclined track is formed for said truck, down which it will continually of its own weight descend, substantially as set forth.

2. The combination, with a pair of large wheels or rims and a truck which runs upon a track formed by the internal faces of said wheels, of a pair of arms running from said rims to a point central thereto, short shafts or gudgeons thereon, outside supporting draft or other rods, a frame-work running around in proximity to the rims, and the cross-bars connecting them, and a rod connecting said framework and said truck, whereby the motion of said truck is steadied, substantially as set forth.

3. The combination, with a pair of large wheels or rims, the internal faces of which form the track for a truck, of arms extending from said rims to a point central thereto, provided at said central point with short shafts or gudgeons, and draft-rods attached to said gudgeons and extending to a point to one side of said rims, where the motive power can be readily applied thereto, substantially as set forth.

4. The combination of the rims A, truck B, arms C, having shafts or gudgeons c, and draft-rods D, all substantially as shown and described, and for the purposes specified.

5. The combination of the rims A, truck B, arms C, short shafts c, rods D, frame F, and rod G, all substantially as set forth.

In witness whereof I have hereunto set my hand and seal, at Indianapolis, Indiana, this 14th day of December, A. D. 1881.

JAMES E. HELLER. [L. S.]

In presence of—
C. BRADFORD,
EDWIN F. MAY.